United States Patent
Usukura et al.

(10) Patent No.: US 6,574,191 B1
(45) Date of Patent: Jun. 3, 2003

(54) LINE SWITCHING SYSTEM AND METHOD

(75) Inventors: Takashi Usukura, Tokyo (JP); Toshio Suzuki, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/391,409

(22) Filed: Sep. 8, 1999

(30) Foreign Application Priority Data

Aug. 9, 1998 (JP) .......................................... 10/253134

(51) Int. Cl.[7] .............................................. H04L 12/28
(52) U.S. Cl. .................... 370/216; 370/395.1; 370/535
(58) Field of Search ................... 370/216, 217, 370/218, 228, 229, 231, 341, 235, 236.2, 395.1, 396, 542, 401, 409, 535, 536, 532, 537, 225, 242, 314, 337, 347, 352, 356, 392, 394, 437, 474

(56) References Cited

U.S. PATENT DOCUMENTS

| | | | |
|---|---|---|---|
| 5,608,733 A | 3/1997 | Vallée et al. ................. 370/394 |
| 5,875,192 A * | 2/1999 | Cam et al. ................... 370/389 |
| 5,970,067 A * | 10/1999 | Sathe et al. .................. 370/394 |
| 6,002,670 A * | 12/1999 | Rahman et al. .............. 370/238 |
| 6,205,142 B1 * | 3/2001 | Vallee ......................... 370/394 |

FOREIGN PATENT DOCUMENTS

JP 10-500271 1/1998

* cited by examiner

Primary Examiner—Douglas Olms
Assistant Examiner—Brian Nguyen
(74) Attorney, Agent, or Firm—Foley & Lardner

(57) ABSTRACT

In an inverse multiplexing system composed of a plurality of intermediate transmission lines, a stream of packets is divided into a plurality of packet blocks each having next line identification information added thereto. At a receiving device, the original stream of packets can be reproduced from the received packet blocks only by referring to the next line identification information associated with the received data packet, resulting in the reduced amount of memory capacity at the receiving device. When detecting the occurrence of a failure on an intermediate transmission line, the receiving device notifies the sending device of the failure occurrence. The sending device switches the transmission sequence.

15 Claims, 12 Drawing Sheets

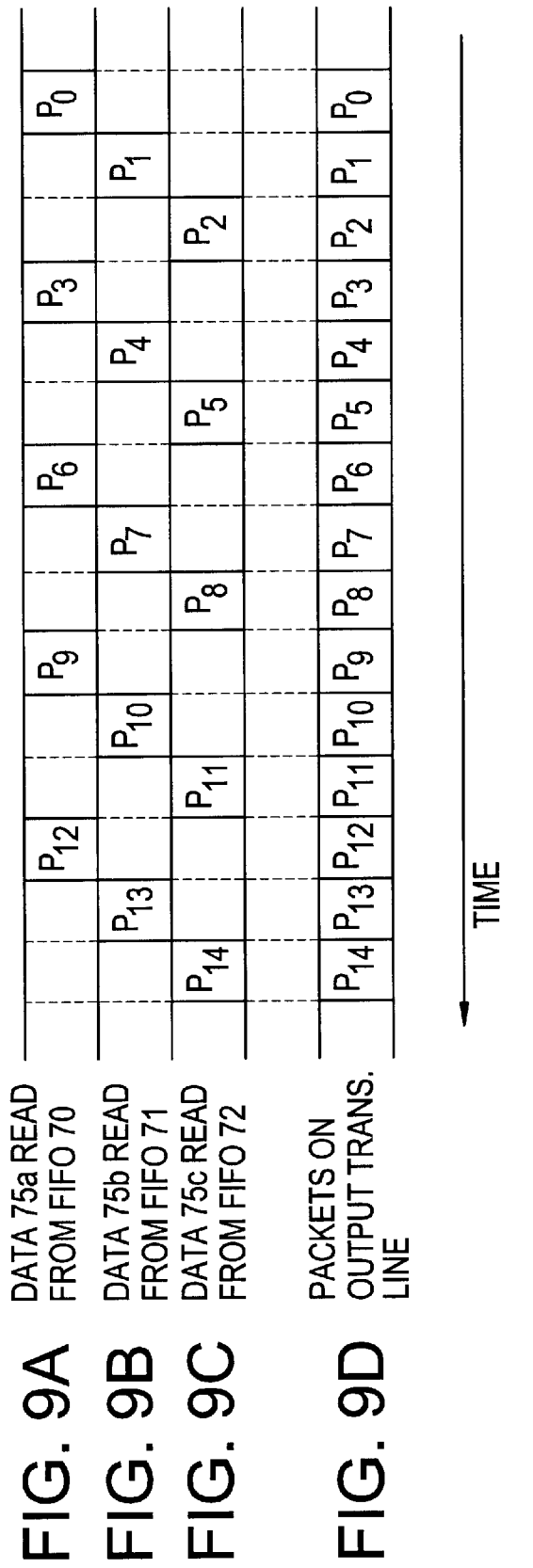

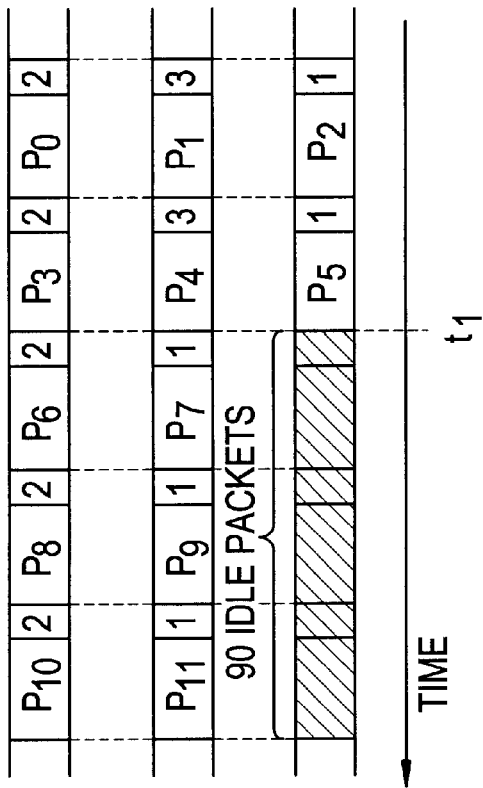
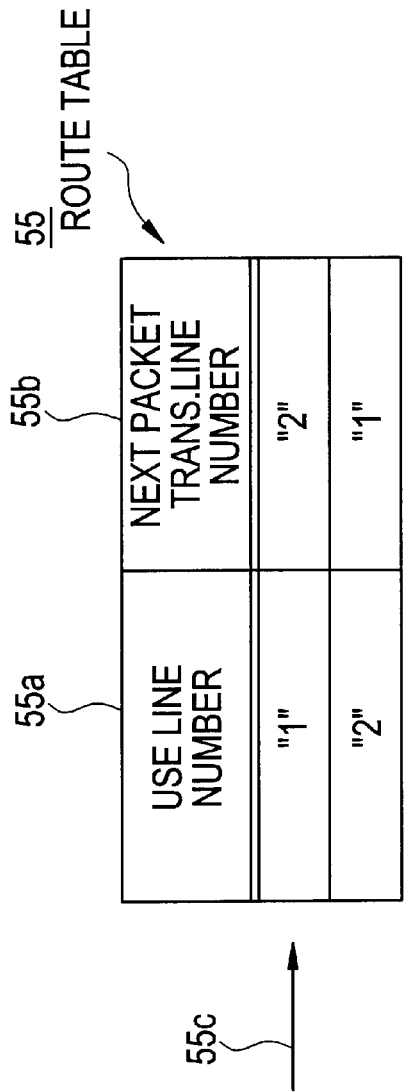

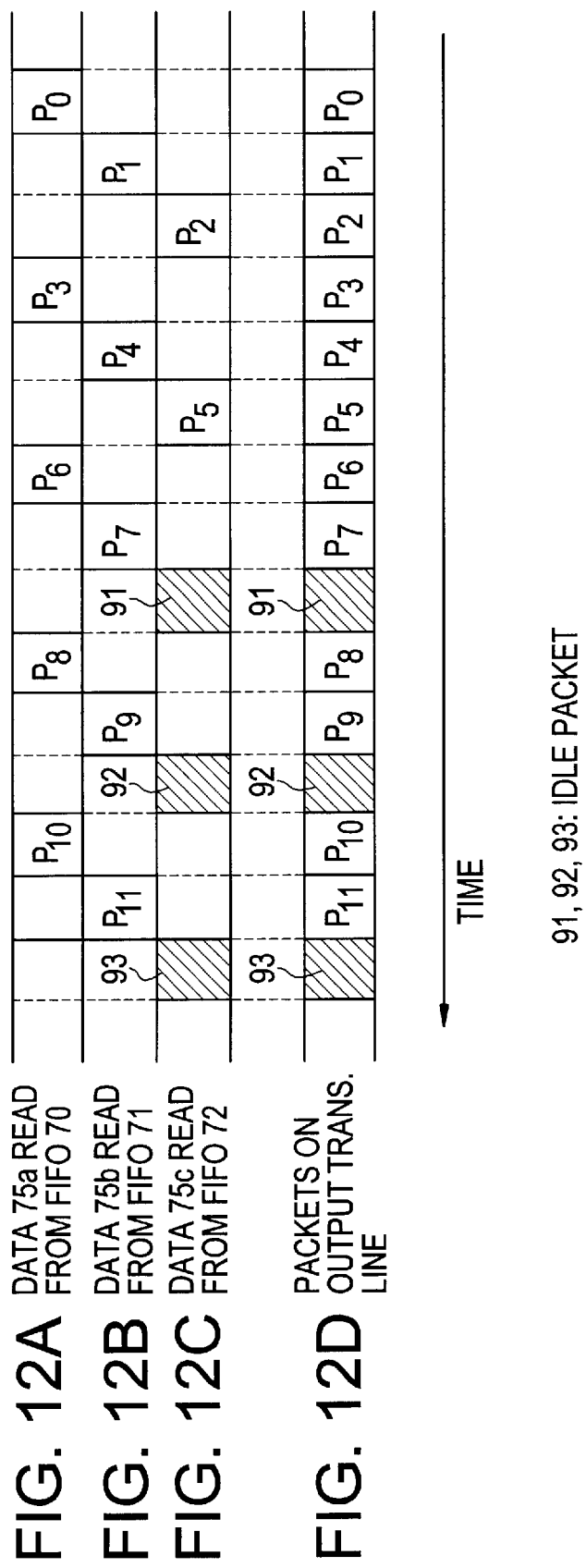

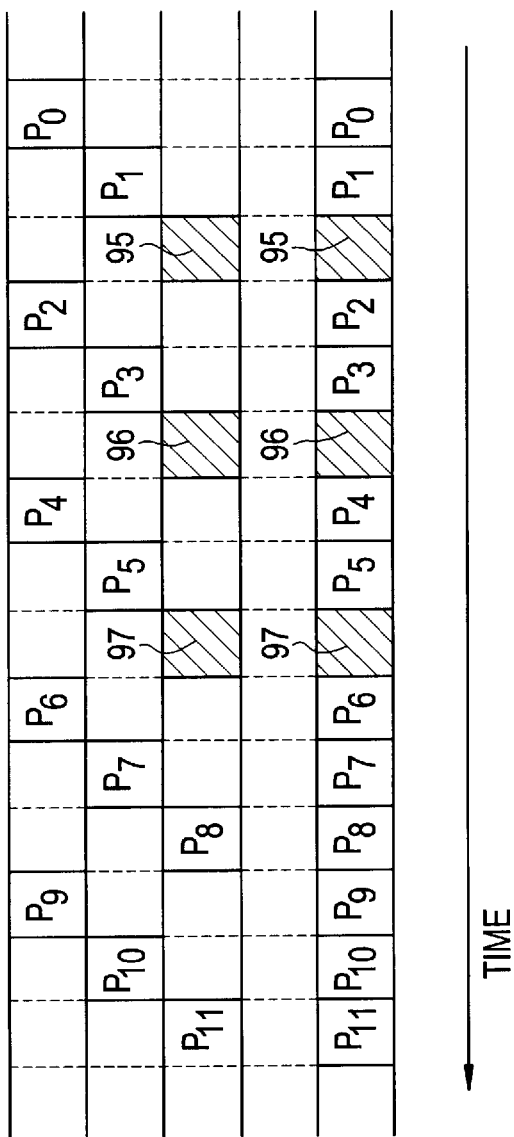

LINE SWITCHING SYSTEM AND METHOD

BACKGROUND OF THE INVENTION

1. Field of the Invention

The present invention relates to a data communication system including a plurality of low-speed transmission lines which are connected between high-speed transmission lines, and in particular to a transmission line switching system and an inverse multiplexing transmission method which are used for the system.

2. Description of the Related Art

As information processing and data transmission technologies progress, a demand for a higher transmission capability is growing while it is also demanded that a communication cost can be made as low as possible. In view of this cost/speed tradeoff, an inverse multiplexing technique is one of attractive communication schemes. Especially, an IMA (Inverse Multiplexing for ATM) technique has received widespread attention.

According to the IMA technique, in data transmission on a physical layer, an ATM cell stream on a high-speed transmission line is divided by an inverse multiplexer into a plurality of cell streams each travelling through a lower speed transmission line. The respective divided cell streams are sent through the plurality of lower speed transmission lines to a multiplexer. The divided cell streams are multiplexed by the multiplexer into the original ATM cell stream which is sent to the other high-speed transmission line. Such an IMA technique has been prepared by ATM Forum (see AF-PHY-0086.000).

In Japanese Unexamined Patent Publication No. 10-500271, there has been proposed an ATM inverse multiplexing technique. An outline of this conventional technique will be explained with reference to FIG. 1.

As shown in FIG. 1, an input stream of ATM cells (here, $P_0$–$P_8$) on a high-speed line is distributed among a plurality of low-speed lines (here, three low-speed lines: LS-Line1, LS-Line2, and LS-Line3) in a round robin fashion. Therefore, it is necessary for both of an ATM cell sending device and an ATM cell receiving device to operate according to the round robin order to successfully combine the distributed ATM cell streams on the low-speed lines into the original ATM cell stream. For this, the ATM cell sending device and the ATM cell receiving device transmit an OAM (operation administration and maintenance) cell including a cell sequence number and a field-back line status field.

In FIG. 1, for example, the ATM cell sending device transmits through the first low-speed line LS-Line1 a first OAM cell $OAM_1$ followed by ATM cells $P_0$, $P_3$ and $P_6$ in the order shown and thereafter a second OAM cell $OAM_2$. It is the same with the other low-speed lines LS-Line2 and LS-Line3. In other words, the ATM cell sending device regularly inserts an OAM cell into each of the low-speed lines LS-Line1 through LS-Line3. On the other hand, the ATM cell receiving device sends back the OAM cell regularly. The cell sequence number included in the OAM cell is used to specify the round robin order and the field-back line status field thereof is used to indicate receive-ready status according to the specified round robin order. Furthermore, even if the number of low-speed cell lines which can be used in changed due to some failure, the round robin order can be regularly recognized using the OAM cell transmitted between the ATM cell sending and receiving devices.

According to the conventional transmission line switching system as mentioned above, the ATM cell receiving device reproduces the original ATM cell stream from the divided cell streams using the OAM cell which is regularly inserted. Therefore, it is necessary for the ATM cell receiving device to store the divided cells between the first and second OAM cells received through the low-speed lines.

However, in the case where arrival time deviations occur among the low-speed cell lines due to protocol control which is carried out for each of the low-speed cell lines as shown in FIG. 1, all the cells included in the range from the first cell $P_0$ on the fastest line LS-Line1 to the last cell $P_7$ on the slowest line LS-Line2 are stored in the ATM cell receiving device. More specifically, in FIG. 1, the cells to be stored consist of the distributed cells $P_0$–$P_8$ as well as five protocol waiting cells indicated by reference symbol P. Accordingly, the ATM cell receiving device needs a cell storing memory device having a large capacity.

Further, since the OAM cell is used as a unit of cell management, a failure/restoration detection interval at the receiving side highly depends on the position and the transmission interval of an OAM cell. Furthermore, in the case of an inverse-multiplexing device requiring the change of the setting of the intermediate transmission lines and the failure restoration mechanism, the operation using the OAM cell needs a complicated and time-consuming protocol. As a consequence, a delay in the detection of occurrence of some failure itself becomes large with an increase in number of the intermediate transmission lines and further, when a failure occurs on a line, it becomes difficult to switch over the line to another line as early as possible.

SUMMARY OF THE INVENTION

An object of the present invention is to provide a data transmission system and method which is capable of performing an inverse multiplexing operation with reduced amount of memory for storing data which are received through a plurality of intermediate transmission lines.

Another object of the invention is to provide a transmission system and a switching device which are capable of detecting the occurrence of a failure on the intermediate transmission lines in a shortest time possible and rapidly performing a switch-over of the intermediate transmission lines.

According to the present invention, in a system for transmitting a stream of data from a first transmission line to a second transmission line through a plurality of intermediate transmission lines, a line speed of each of the intermediate transmission lines is lower than that of each of the first and second transmission lines and a total line capacity of the intermediate transmission lines is larger than a line capacity of each of the first and second transmission lines. A method comprises the steps of:

a) dividing the stream of data received from the first transmission line into a plurality of data blocks;

b) distributing the plurality of data blocks together with next line identification information corresponding to each of the data blocks among the plurality of intermediate transmission lines, the next line identification information identifying an intermediate transmission line to which a next data block following the data block is to be transmitted;

c) receiving data blocks having the next line identification information added thereto from the plurality of intermediate transmission lines; and d) reproducing the stream of data from the data blocks received from the plurality of intermediate transmission lines by referring to the next line identification information added to each of the data blocks to transmit the stream of data to the second transmission line.

According to another aspect of the present invention, a sending device connecting the first transmission line to the plurality of intermediate transmission lines divides the stream of data received from the first transmission line into a plurality of data blocks. Then the sending device distributes the plurality of data blocks together with next line identification information corresponding to each of the data blocks among the plurality of intermediate transmission lines, the next line identification information identifying an intermediate transmission line to which a next data block following the data block is to be transmitted. A receiving device connects the plurality of intermediate transmission lines to the second transmission line. The receiving device receives data blocks having the next line identification information added thereto from the plurality of intermediate transmission lines. Each of received data blocks is checked to see whether a failure occurs on any of the intermediate transmission lines. When a failure occurs on an intermediate transmission line, instructing the sending device to use the intermediate transmission lines other than the intermediate transmission line on which the failure occurs to distribute the plurality of data blocks.

According to further another aspect of the present invention, a method comprises the steps of:

at the sending device,
a) dividing the stream of data received from the first transmission line into a plurality of data blocks; and
b) distributing the plurality of data blocks together with next line identification information corresponding to each of the data blocks among the plurality of intermediate transmission lines, the next line identification information identifying an intermediate transmission line to which a next data block following the data block is to be transmitted.

at the receiving device,
c) receiving data blocks having the next line identification information added thereto from the plurality of intermediate transmission lines;
d) storing a past selection sequence of the intermediate transmission lines;
e) counting the number of times the next line identification information added to a received data block deviates from the past selection sequence; and
f) when a counter exceeds a predetermined value, updating the past selection sequence.

BRIEF DESCRIPTION OF THE DRAWINGS

FIGS. 8A–8C are diagrams showing sequences of packets travelling through the intermediate transmission lines, respectively;

FIGS. 9A–9D are diagrams showing an example of packet combination to reproduce an original packet stream on the output transmission line;

FIGS. 10A–10C are diagrams showing sequences of packets travelling the intermediate transmission lines, respectively, in the case where a failure occurs on one of the intermediate transmission lines;

FIG. 11 is a diagram showing an example of the contents of the route table which has been changed depending on the failure detection;

FIGS. 12A–12D are diagrams for explaining an operation of the multiplexing device in the case where the failure occurs in one of the intermediate transmission lines;

FIGS. 14A–14D are diagrams for explaining an operation of the multiplexing device in the case where the failure is restored.

DESCRIPTION OF THE PREFERRED EMBODIMENTS

Figure 1:
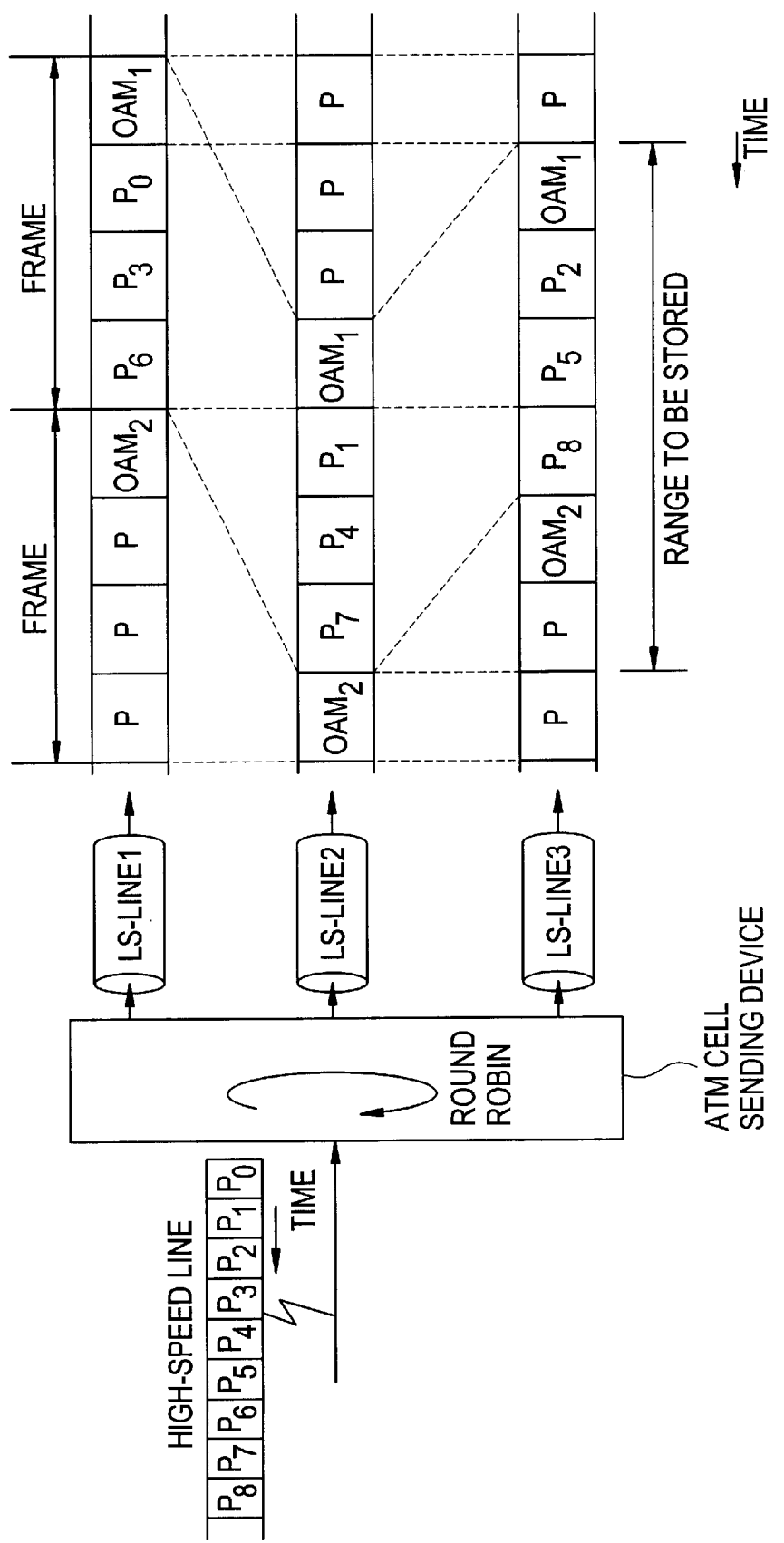
FIG. 1 is a diagram showing a conventional inverse multiplexing system.
Figure 2:
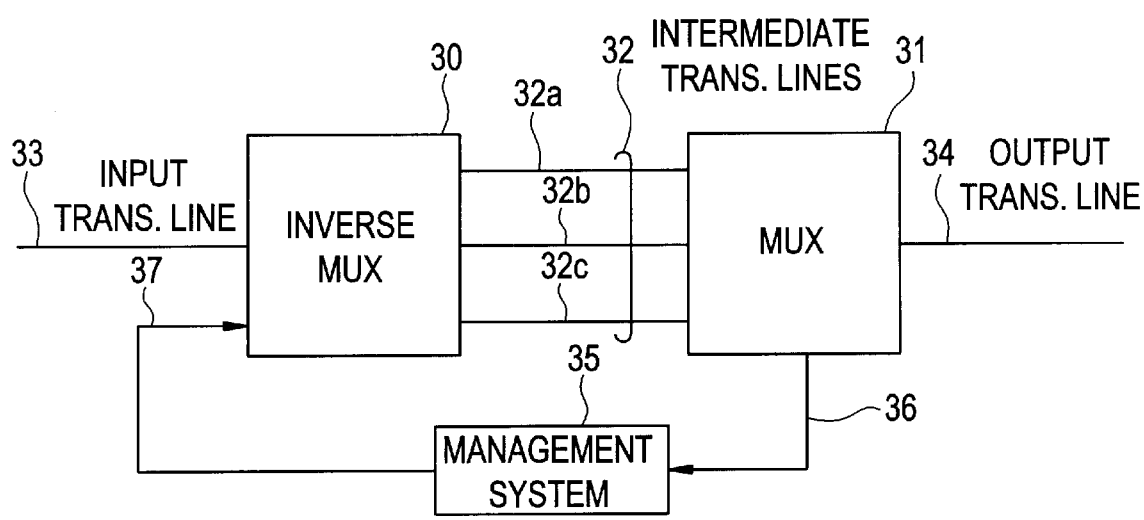
FIG. 2 is a schematic block diagram showing an inverse multiplexing system according to an embodiment of the present invention.

Referring to FIG. 2, a transmission line switching system is composed of an inverse multiplexing device 30 and a multiplexing device 31 which are connected through an intermediate connection 32. The intermediate connection 32 consists of a plurality of intermediate transmission lines or lower-speed transmission links which are connected in parallel. Here, for the sake of explanation, it is assumed that the intermediate connection 32 consists of three intermediate transmission lines 32a, 32b and 32c.

The inverse multiplexing device 30 has an input transmission line 33 connected thereto, which has a signal transmission speed higher than each of the intermediate transmission lines 32a, 32b and 32c. The multiplexing device 310 has an output transmission line 34 connected thereto, which has a signal transmission speed higher than each of the intermediate transmission lines 32a, 32b and 32c. In other words, the input transmission line 33 and the output transmission line 34 are a high-speed transmission line and the intermediate transmission line is a low-speed transmission line.

A communication capacity of each of the intermediate transmission lines 32a, 32b and 32c is smaller than that of each of the input transmission line 33 and the output transmission line 34. It should be noted that the total communication capacity of the intermediate transmission lines 32a, 32b and 32c is larger than that of each of the input transmission line 33 and the output transmission line 34. If the communication capacity of the input transmission line 33 exceeds the total communication capacity of the intermediate transmission connection 32, an overflow of data would occur in the inverse multiplexing device 30.

In general, the communication capacity of the input transmission line 33 is equal to that of the output transmission line 34. However, there is a case where the communication capacity of the input transmission line 33 is larger than that of the output transmission line 34 depending on the handling of idle packets, that is, the discard of the idle packets.

An operation of the transmission line switching system will be described. The inverse multiplexing device 30 receives a stream of fixed-length packet data through the input transmission line 33 which is a high-speed input transmission line. Here, the fixed-length packet refers to an ATM cell and other packets having an arbitrary length.

The inverse multiplexing device 30 divides the received stream of fixed-length packet data into a plurality of streams of transmission packet data travelling through the intermediate transmission lines 32a–32c, respectively (inverse multiplexing). Each of the transmission packets includes one or more fixed-length packet. At this time, the inverse multiplexing device 30 adds line identification information to the transmission packet data to be transmitted. The line identification information, as will be described later, identifies the next intermediate transmission line through which the next transmission packet is to be transmitted. Alternatively, the inverse multiplexing device 30 may transmits the line identification information separately.

When receiving the respective streams of transmission packet data through the intermediate transmission lines 32a–32c, the multiplexing device 31 multiplexes the received transmission packet data to reproduce an original stream of fixed-length packet data by referring to the line identification information added to them. The multiplexed data packet stream is output to the output transmission line 34.

Further, the system is provided with a management system 35 which connects the multiplexing device 31 to the inverse multiplexing device 30 through a dedicated line. As described later, in the process of the multiplexing operation, the multiplexing device 31 checks whether the transmission packet data is normally received. When some failure is detected, the multiplexing device 31 may output a failure detection signal 36 to the management system 35.

The management system 35 has basically four functions described below. The management system 35 gives bandwidth information of each of the intermediate transmission line to the inverse multiplexing device 30 using a line change information notice 37. The bandwidth information is used to distribute the input packets among the intermediate transmission lines 32a–32c. The management system 35 instructs the inverse multiplexing device 30 to set and change the line identification information which is added to a transmission packet through the line change information notice 37. When receiving the failure detection signal 36 from the multiplexing device 31, the management system 35 allows the inverse multiplexing device 30 to change the added content of the line identification information so as to avoid the impaired line and restore a normal transmission state. In other words, the management system 35 has a function of managing the intermediate transmission lines 32a–32 c.

The inverse multiplexing device 30 has a function of selecting an appropriate intermediate transmission line used at the time of failure detection and restoration in accordance with the line change information notice 37.

Inverse Multiplexing

Figure 3:
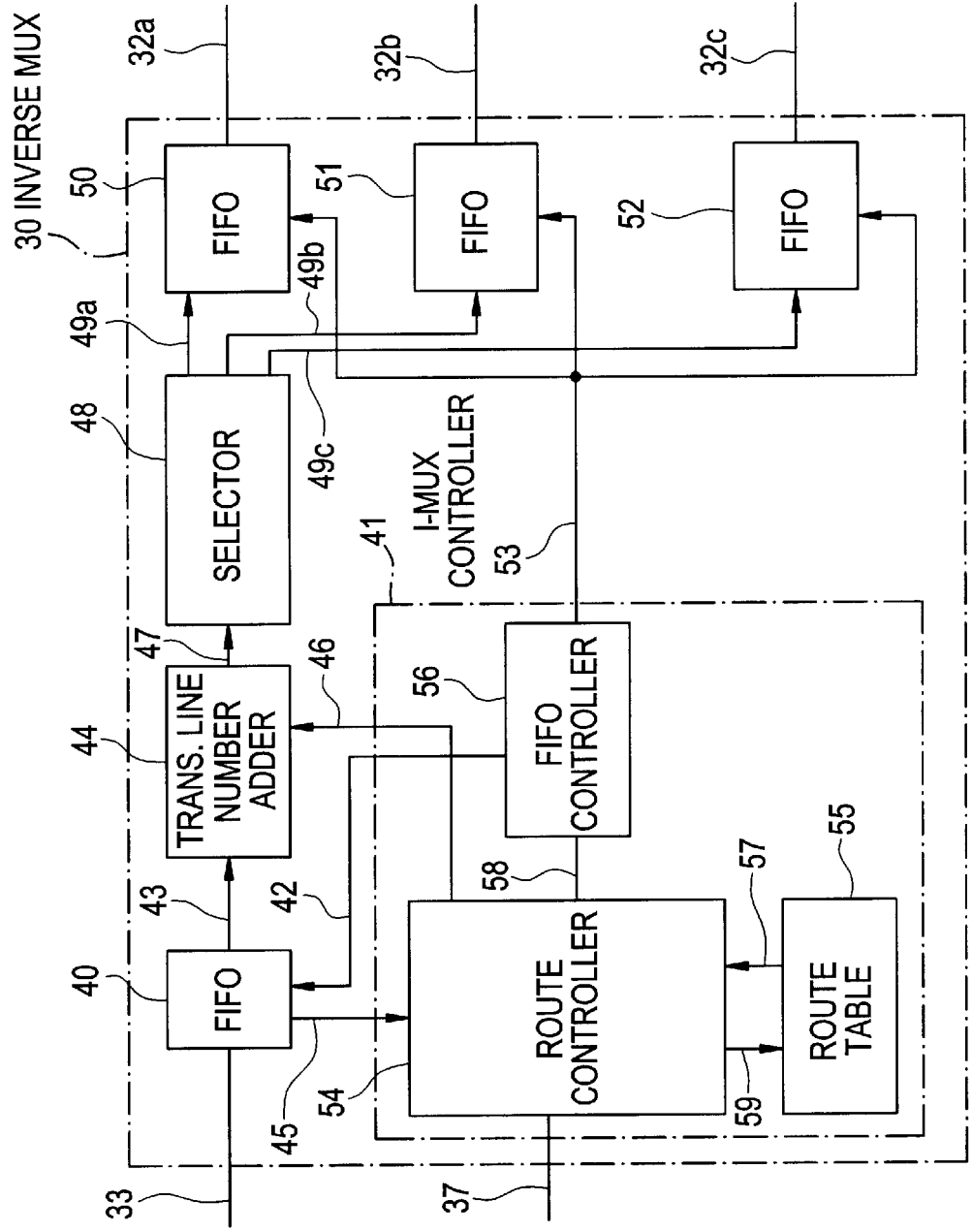
FIG. 3 is a block diagram showing an internal circuit configuration of an inverse multiplexing device according to the embodiment of the present invention.

Referring to FIG. 3, the inverse multiplexing device 30 is provided with a FIFO (First-In-First-Out memory) 40. The FIFO 40 stores a series of fixed-length packets received from the high-speed input transmission line 33 according to an input-FIFO control signal 42 and then reads out a packet block obtained by dividing the stored fixed-length packets depending on the input-FIFO control signal 42. An inverse multiplexing controller 41 provides the input-FIFO control signal 42. The packet blocks are sequentially output to the transmission line number adder 44.

The inverse multiplexing controller 41 further checks whether a received fixed-length packet is valid. For example, when a failure on the high-speed input transmission line 33 occurs at the time of receiving a fixed-length packet, or when the received packet is an idle packet to be discarded (e.g. the routing information of a received ATM cell is not registered), the received packet/cell is discarded.

The transmission line number adder 44 adds the next packet transmission line number to a read packet block 43 in accordance with selected line information 46 which is provided by the inverse multiplexing controller 41, thereby forming a route-added packet block 47 which is output to a selector 48. The selector 48 select one of the routes 49a–49c depending on the route information added to the packet block 47 and transfers the route-added packet block 47 to a corresponding one of output FIFOs 50–52 which are connected to the intermediate transmission lines 32a–32c, respectively. The read/write control of the output FIFOs 50–52 is performed depending on an output-FIFO control signal 53 which is provided by the inverse multiplexing controller 41.

Figure 4:
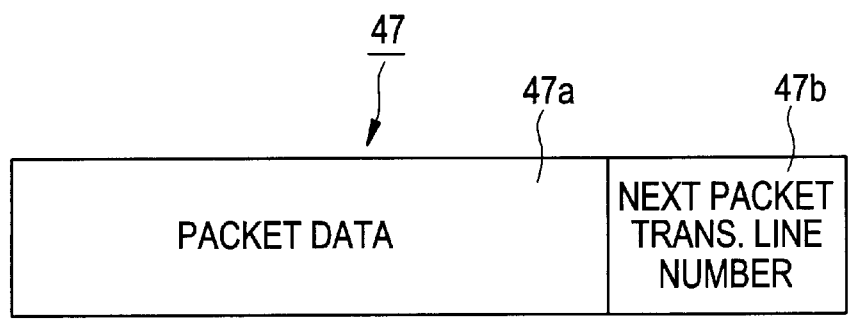
FIG. 4 is a diagram showing format of transmission data packet which is divided by the inverse multiplexing device.

Referring to FIG. 4, a route-added packet block 47 is composed of a packet block 47a and a next packet transmission line number 47b. The next packet transmission line number 47b is the line identification number of an intermediate transmission line through which the next transmission packet block is to be transmitted. The bit length of a next packet transmission line number 47b is determined in accordance with the number of the intermediate transmission lines. For example, in the case of eight intermediate transmission lines, the bit length of a next packet transmission line number 47b is set to 3.

In this embodiment, a series of the fixed-length packets received from the input transmission line 33 is distributed among three intermediate transmission lines 32a–32c. Generally, in the case of N intermediate transmission lines $32_1-32_N$, the fixed-length packets are divided into N packet blocks which have data lengths corresponding to the intermediate transmission lines, respectively.

For example, in the case where the series of fixed-length packets comprises a, b, c, d, e and f, the fixed-length packets can be divided into three packet blocks: (a, b), (c), and (d, e, f). The transmission line number adder 44 adds a transmission line number to each of the packet blocks (a, b), (c), and (d, e, f) to produce a route-added packet block. By referring to the transmission line number, the selector 48 sequentially delivers the route-added packet block to a corresponding one of the output FIFOs 50–52. Here, the packet blocks (a, b), (c), and (d, e, f) are output to the output FIFOs 50–52, respectively. Thereafter, according to the output-FIFO control signal 53, the respective output FIFOs 50–52 transmit them to the multiplexing device 31 through the intermediate transmission lines 32a, 32b and 32c.

The inverse multiplexing controller 41 includes a route controller 54, a route table 55, and a FIFO controller 56 to control the operations of the inverse multiplexing device 30. The route controller 54 receives an idle packet detection signal 45 from the input FIFO 40 and performs a line selection control based on the idle packet detection signal 45 while referring to the route table 55. A selected transmission line number, that is, route information, is output to the transmission line number adder 44.

Figure 5:
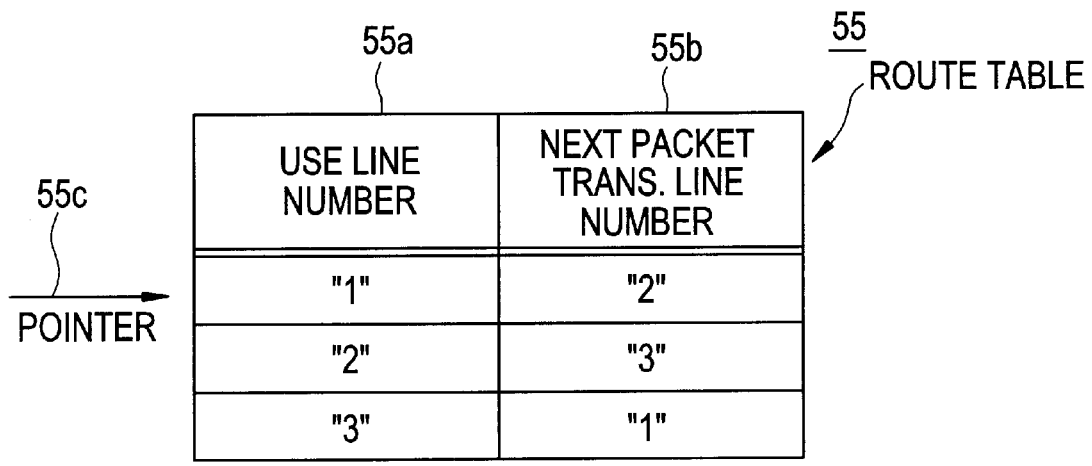
FIG. 5 is a diagram showing a route table used to determine a next packet transmission line number in the inverse multiplexing device.

As shown in FIG. 5, the route table 55 has two fields: use line number 55a and next packet transmission line number 55b. The use line number 55a identifies an intermediate transmission line through which a transmission packet block is transmitted, and the next packet transmission line number 55b identifies another intermediate transmission line through which the next packet block following the current packet block is to be subsequently transmitted. As described before, the next packet transmission line number is added to the header of a transmission packet block as shown in FIG. 4.

The route controller 53 changes a pointer 55c of the route table 55 based on the timing of the input-FIFO control signal and the idle packet detection signal 45 to receive route information 57 including the use line number and the corresponding next packet transmission line number from the route table 55. The pointer 55c is changed in accordance with the read timing of the input FIFO 40, that is, the timing of the input-FIFO control signal. However, in the case of an idle packet, the route selection is not performed for that idle packet. Therefore, when the idle packet detection signal 45 is received from the input FIFO 40, the route controller 54 performs a mask operation such that the position of the pointer 55c is not changed. The route controller 54 can output route change information 59 to the route table 55 to change the contents of the route table 55.

The FIFO controller 56 controls the generation timing of the input FIFO control signal 42 and the output FIFO control signal 53 in accordance with a control signal 58 received from the route controller 54. As a consequence, at the FIFO's 40, 50–52, a pointer showing a write position and a pointer showing a read position are controlled so that the data reading and writing are carried out. In the case where data is discarded from a FIFO, next data is written over the data to be discarded according to the write pointer.

Furthermore, when the route controller 54 inputs the route change information notice 37 from the management system 35, the route controller 54 gives the route change information 59 to the route table 55 so as to update the registration information of the route table 55. The route controller 54 may also input the bandwidth information of the intermediate transmission lines through the route change information notice 37.

Figure 6:
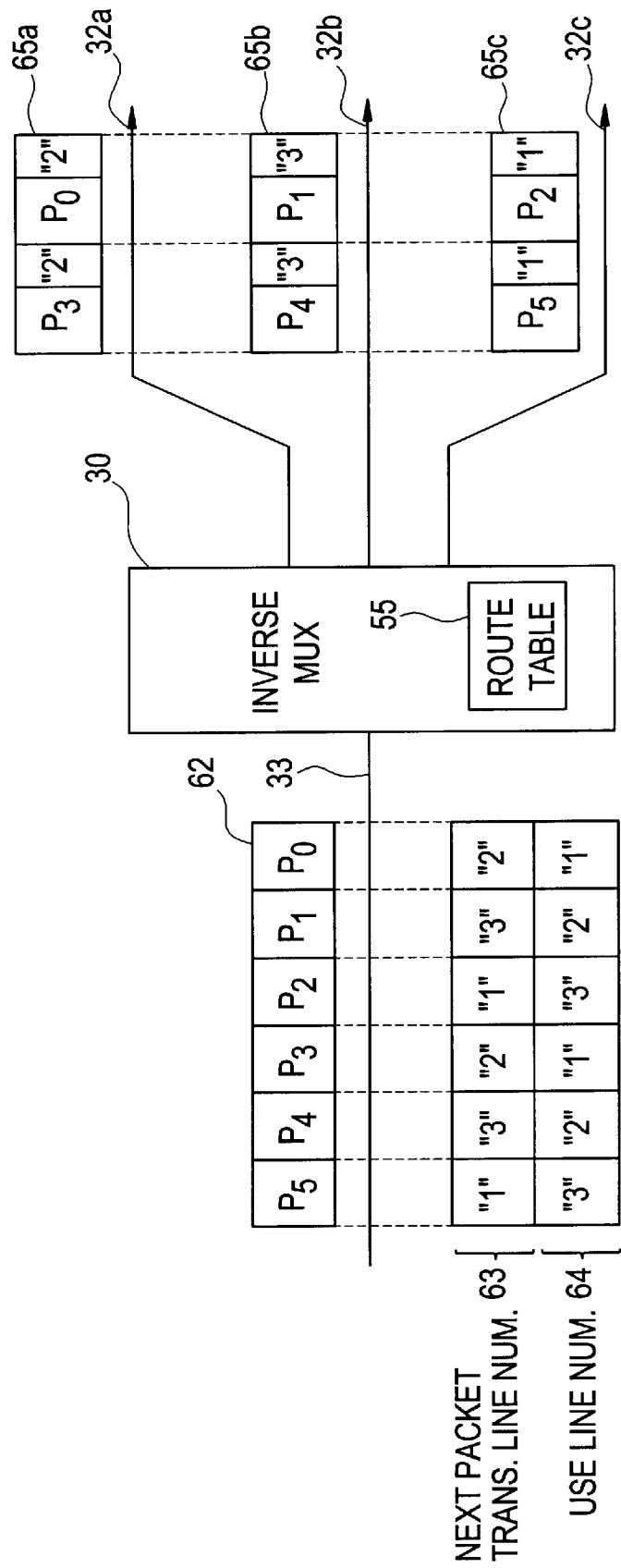
FIG. 6 is a diagram showing an example of packet distribution performed by the inverse multiplexing device.

Referring to FIG. 6, it is assumed that a single stream of fixed-length packets $P_0, P_1, \ldots P_5$ is input through the high-speed input transmission line 33 and is divided in units of a single fixed-length packet by the inverse multiplexing device 30. It is further assumed that the pointer 55c of the route table 55 is initially positioned at the first record, that is, a combination of the use line number "1" and the next packet transmission line number "2", as shown in FIG. 5.

The leading packet $P_0$ is read first from the FIFO 40 and is sent to the transmission line number adder 44. At this time, the route controller 54 reads the route information 57 pointed by the pointer 55c from the route table 55. As shown by reference numerals 63 and 64 in FIG. 6, the route information 57 for the leading packet $P_0$ includes the use line number "1" indicating the intermediate transmission line 32a and the next packet transmission line number "2" indicating the intermediate transmission line 32b. Therefore, the next packet transmission line number "2" is output as selected line information 46 to the transmission line number adder 44 and is added as the next packet transmission line number 47b to the leading packet $P_0$ (see FIG. 4) to produce a route-added packet block which is output to the selector 48.

Since the selector 48 is initially set to select the output FIFO 50 corresponding to the intermediate transmission line 32a, the route-added packet block of the leading packet $P_0$ is transmitted as a packet block 65a through the intermediate transmission line 32a. At this time, the selector 48 checks the next packet transmission line number added to the leading packet $P_0$. Here, since the next packet transmission line number is "2", the selector 48 selects the output FIFO 51 corresponding to the intermediate transmission line 32b as a next transmission line.

Thereafter, when the second packet $P_1$ is read out from the input FIFO 40, the pointer 55c is shifted to the second record composed of the use line number "2" and the next packet transmission line number "3". Therefore, the next packet transmission line number "3" is output as selected line information 46 to the transmission line number adder 44 and is added to the second packet $P_1$ to produce a route-added packet block 47 which is output to the selector 48. Since the selector 48 has been set to select the FIFO 51 corresponding to the intermediate transmission line 32b, the route-added packet block 47 of the second packet $P_1$ is transmitted as a packet block 65b through the intermediate transmission line 32b. At this time, the selector 48 checks the next packet transmission line number added to the second packet $P_1$. Here, since the next packet transmission line number is "3", the selector 48 selects the output FIFO 52 corresponding to the intermediate transmission line 32c as a next transmission line. It is the same with the following packets $P_2, \ldots P_5$ as shown in FIG. 6.

In this manner, the fixed-length packets of the single stream 62 on the input transmission line 33 are distributed among three intermediate transmission lines 32a, 32b and 32c. In other words, the packets $P_0$ and $P_3$ are sent out to the intermediate transmission line 32a with the addition of the next packet transmission line number "2", respectively. The packets $P_1$ and $P_4$ are sent out to the intermediate transmission line 32b with the addition of the next packet transmission line number "3", respectively. The packet $P_2$ and $P_5$ are sent out to the intermediate transmission line 32c with the addition of the next packet transmission line number "1".

Multiplexing

Figure 7:
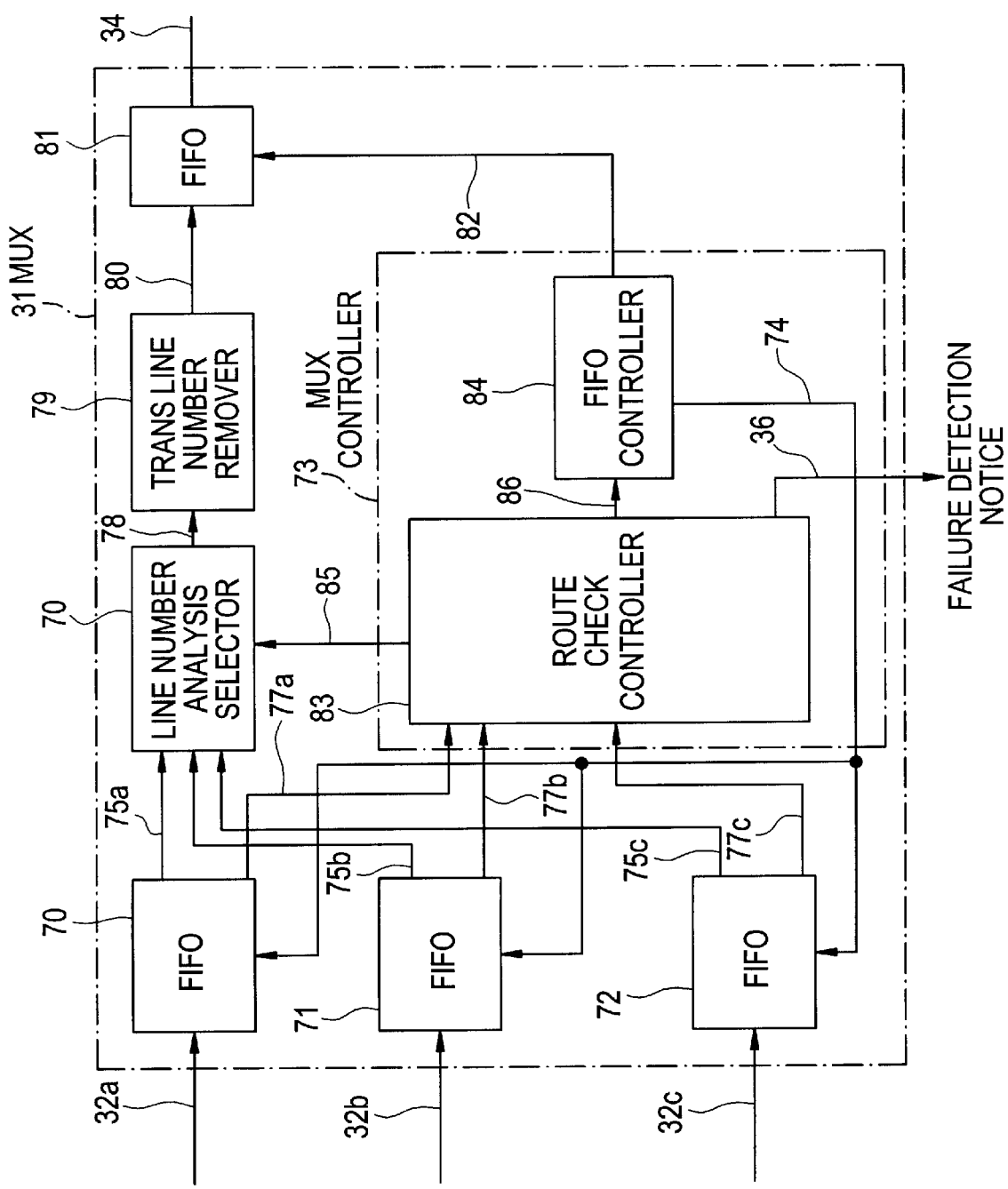
FIG. 7 is a block diagram showing an internal circuit configuration of the multiplexing device according to the embodiment of the present invention.

Referring to FIG. 7, the multiplexing device 31 is provided with input FIFOs 70, 71 and 72 which are connected to the intermediate transmission lines 32a, 32b, and 32c, respectively. The respective FIFOs 70–72 store the transmission packet blocks received from the intermediate transmission lines 32a, 32b and 32c in accordance with input FIFO control signal 74 supplied by a multiplexing controller 73. More specifically, the write timing of the FIFO's 70–72 depends on the transmission speed of each intermediate transmission line. Therefore, the write timing may be different from each other. The transmission packet blocks are read out one by one from each of the FIFOs 70–72 according to the timing of the input FIFO control signal 74 and the respective transmission packet blocks are output as read data 75a–75c to a line number analysis selector 76.

The multiplexing controller 73 controls the operations of the multiplexing device 31. As will be described later, the multiplexing controller 73 inputs line identification information 77a, 77b and 77c from the FIFO's 70, 71 and 72, respectively. The line identification information includes parity-check information and the next packet transmission line number for the corresponding intermediate transmission line. At the multiplexing controller 73, the parity-check information is used to determine whether an error occurs in received data itself.

The line number analysis selector 76 receives the read data 75a, 75b and 75c, analyzes the next packet transmission line number included in the read data 75a, 75b and 75c, and determines the selection order of the FIFO's 70–72 depending on the next packet transmission line number included in the read data. In other words, the line number analysis selector 76 selects one of the read data 75a, 75b and 75c on the basis of the determined selection order, and sequentially outputs the selected data 78 to a transmission line number remover 79. Further, the route check controller 83 is provided with an idle packet generator (not shown) which generates an idle packet in response to an error detection signal 85.

The transmission line number remover 79 removes the next packet transmission line number from the selected data 78 to produce a series of fixed-length packets 80. The fixed-length packets 80 are output to an output FIFO 81, which accumulates them in accordance with an output-FIFO control signal 82 supplied by the multiplexing controller 73. Then, the fixed length packets stored in the FIFO 81 are sequentially read out in accordance with the output FIFO control signal 82. Through such a procedure, a series of fixed-length packets which is the same as the sending side is reproduced and transmitted to the high-speed output transmission line 34.

The multiplexing controller 73 includes a route check controller 83 and a FIFO controller 84. The route check controller 83 identifies a validity of the transmission packet blocked received from each of the intermediate transmission lines 32a, 32b and 32c. The FIFO controller 84 outputs the input FIFO control signal 74 to the FIFO's 70–72 at a predetermined timing and outputs an output FIFO control signal 82 to a FIFO 81 to control the write and read operations of the input FIFO's 70–72 and the output FIFO 81, respectively.

The route check controller 83 detects the unusual state of the intermediate transmission lines on the basis of the line identification information 77a, 77b and 77c. When the route check controller 83 detects an error from the received data on a line, it sends the error detection signal 85 to the line number analysis selector 76. In addition, when the route check controller 83 detects the data error on the line, it sends out a packet discard instruction signal 86 to the FIFO controller 84. Furthermore, when the route check controller 83 detects the error on the line, it outputs a failure detection information notice 36 to the management system 35, which will be described later.

The line number analysis selector 76 has the idle packet generator (not shown) so that the instructed packet data can be switched over to the idle packet data. Furthermore, the FIFO controller 84 discards a packet within the FIFO's 70–72 in accordance with the packet discard instruction signal 86 input from the route check controller 83.

The parity-check information and the line identification information are used for route checking in the route check controller 83. Hereinafter, an example of such a route checking method will be described.

When detecting an error in the received data itself by means of parity check, the route check controller 83 promptly produces the error detection signal 85 and the packet discard instruction signal 86. This causes the line number analysis selector 76 to switch the erroneous packet to the idle packet, that is, the erroneous packet is discarded.

On the other hand, the route check controller 83 memorizes the past valid line selection order for the transmission packet blocks. The past valid line selection order is obtained from the read data of the FIFO's 70–72. Then, the route check controller 83 compares the currently received line identification information with the past valid line selection order for each input FIFO. When the currently received line identification information follows the past valid line selection order, the route check controller 83 does not allow a counter (not shown) to increment. When the currently received line identification information deviates from the past valid line selection order for the corresponding FIFO, the route check controller 83 allows the counter to increment.

When the count value of the counter does not exceed a predetermined value, the route check controller 83 determines that some error occurs. In this case, similarly to the parity check procedure, the route check controller 83 promptly produces the error detection signal 85 and the packet discard instruction signal 86 to switch the erroneous packet to the idle packet without updating the current route selection order.

Contrarily, when the count value of the counter exceeds the predetermined value, the route check controller 83 determines that the transmission line selection order has been changed at the sending side and updates the current route selection order without switching the line number analysis selector 76 or discarding the packet from the FIFO. Then, the route check controller 83 memorizes the currently obtained line selection order as an updated valid line selection order which will be used for the route check from then on until updated.

The predetermined value of the counter is sot in advance in the route check controller 83. The predetermined value of the counter can be set to a large value in order that the route check controller 83 becomes strong against an erroneous line selection order paused by transmission error. However, when the predetermined value is large, an operation of following the line selection order change on the side of the inverse multiplexing device 30 is delayed. Consequently, the predetermined value will be set to an appropriate value in consideration of these robustness/delay tradeoffs.

Next, an operation of the multiplexing device 31 at the time of a normal operation will be explained by referring to FIGS. 8 and 9.

Referring to FIG. 8, the packet $P_0$ having the next packet transmission line number "2" added thereto is transmitted to the intermediate transmission line 32a, the next packet $P_1$ having the next packet transmission line number "3" added thereto is transmitted to the intermediate transmission line 32b, and the further next packet $P_2$ having the next packet transmission line number "1" added thereto is transmitted to the intermediate transmission line 32c.

In this manner, as shown in FIG. 8A, the packets $P_0$, $P_3$, $P_6$, $P_9$ and $P_{12}$ having the next packet transmission line number "2" added thereto travel through the intermediate transmission lien 32a to the multiplexing device 31 in the order presented. At the FIFO 70 of the multiplexing device 31, these packets are sequentially written is accordance with the input FIFO control signal 74 which regulates the write timing depending on the transmission speed of the intermediate transmission line 32a.

Similarly, as shown in FIG. 8B, the packets $P_1$, $P_4$, $P_7$, $P_{10}$, and $P_{13}$ having the next packet transmission line number "3" added thereto travel through the intermediate transmission line 32b to the multiplexing device 31 in the order presented. At the FIFO 71 of the multiplexing devise 31, these packets are sequentially written in accordance with the input FIFO control signal 74 which regulates the write timing depending on the transmission speed of the intermediate transmission line 32b.

As shown in FIG. 8C, the packets $P_2$, $P_5$, $P_8$, $P_{11}$, and $P_{14}$ having the next packet transmission line number "1" added thereto travel through the intermediate transmission line 32c to the multiplexing device 31 is the order presented. At the FIFO 74 of the multiplexing device 31, these packets are sequentially written in accordance with the input FIFO control signal 74 which regulates the write timing depending on the transmission speed of the intermediate transmission line 32c.

When the respective first packet blocks $P_0$, $P_1$, and $P_2$ including the next packet transmission line number "2" have been written onto the input FIFO's 70–72, they are read out from the input FIFO's 70–72 at the same rend timing determined by the input-FIFO control signal 74. It is the same with the following packet blocks. Therefore, block sets ($P_0$, $P_1$, $P_2$), ($P_3$, $P_4$, $P_5$), . . . , and ($P_{12}$, $P_{13}$, $P_{14}$) are sequentially read from the FIFO's 70–72 to the line number analysis selector 76, which holds each set for a time period required for selection of the line number analysis selector 76. In other words, each set is read at intervals of the time period required for the selection.

Referring to FIG. 9, there are shown the selection timing of the read data (blocks) 75a, 75b and 75c at the line number analysis selector 76 and the write timing of a selected packet at the output FIFO 81. For simplicity, the next packet transmission line number for each packet is not shown in FIG. 9.

When a first block set ($P_0$, $P_1$, $P_2$) are read from the FIFO's 70–72 at the reading timing according to the input FIFO control signal 74, the lira number analysis selector 76 first selects the packet block $P_0$ including the next packet transmission line number "2". Since the next packet transmission line number "2" of the packet block $P_0$ indicates the intermediate transmission line 32b, the line number analysis selector 76 subsequently selects the packet block $P_1$ including the next packet transmission line number "3". Since the next packet transmission line number "3" of the packet block $P_1$ indicates the intermediate transmission line 32a, the line number analysis selector 76 selects the packet block $P_2$ including the next packet transmission line number "1". After the packet blocks of the first block set ($P_0$, $P_1$, $P_2$) have been selected, a second block set ($P_3$, $P_4$, $P_5$) are read from the FIFO's 70–72 at the reading timing according to the input FIFO control signal 74. Then, the same selection operation is repeatedly performed by the line number analysis selector 76 until the last block set ($P_{12}$, $P_{13}$, $P_{14}$) has been processed, as shown in FIG. 9.

A selected packet block is sequentially output from the line number analysis selector 76 to the transmission line number remover 79. After removing the next packet transmission line number from each selected packet block by the transmission line number remover 79, the packets $P_0$, $P_1$, $P_2$, $P_3$, $P_5$, . . . $P_{12}$, $P_{13}$, and $P_{14}$ are sequentially stored onto the output FIFO 81 and then are transmitted as a single stream of packets to the high-speed transmission line 34 according to the output-FIFO control signal 82 as shown in FIG. 9(d).

Inverse-MUX/MUX Operation at Occurrence of Failure

Next, as operation will be explained in the case where a failure occurs is one of the intermediate transmission lines by referring to FIGS. 10–12.

As shown in FIG. 10, it is assumed that, at time t1, a failure occurs on the intermediate transmission line 32c and it is detected by the multiplexing device 30. Up to the time t1, the single stream of packets on the input transmission line 33 is distributed among the intermediate transmission lines 32a–32c by the inverse multiplexing device 30 using the line information stored in the route table 55 shown in FIG. 5. Therefore, on the intermediate transmission line 32a, as shown in FIG. 10A, the packets $P_0$ and $P_4$ having the next packet transmission line number "3" added thereto is transmitted up to time t1 . On the intermediate transmission line 32b, as shown in FIG. 10B, the packets $P_1$ and $P_4$ having the next packet transmission line number "3" added thereto is transmitted up to time t1. Furthermore, on the intermediate transmission line 32c, as shown is FIG. 10C, the packets $P_2$ and $P_3$ having the next packet transmission line number "1" added thereto is transmitted up to time t1.

Then, at time t1, the occurrence of a failure on the intermediate transmission line 37c is detected by the route check controller 83 of the multiplexing device 31 as described before. The multiplexing device 31 outputs the failure detection information notice 36 to the management system 35. The management system 35 sends the line information change notice 37 to the inverse multiplexing device 30 to instruct the change of the line information of the route table 55 so that the intermediate transmission line 32c is not selected after time t1.

As shown in FIG. 11, at the inverse multiplexing device 30, the contents of the route table 55 is updated in accordance with the line information change notice 37 received from the management system so that the use line number "3" and the next packet transmission line number "3" is not used. As a consequence, the line information of the route cable 55 is changed from the state shown in FIG. 4 to the state shown in FIG. 11. Therefore, the pointer 55c alternately selects the use line numbers "1" and "2" which are related to the next packet transmission line numbers "2" and "1". Through such a procedure, the packet which is to be sent out to the intermediate transmission line 32c at the time of a normal operation is alternately distributed between the intermediate transmission lines 32a and 32b.

Consequently, as shown in FIG. 10C, after time t1, the inverse multiplexing device 30 transmits idle packets 90 to the intermediate transmission line 37c. On the intermediate transmission line 32a, the following packets $P_6$, $P_8$ and $P_{10}$ having the next packet transmission line number "2" added thereto are sequentially transmitted after time t1. On the intermediate transmission line 32b, the packets $P_7$, $P_9$, and $P_{11}$ having the next packet transmission line number "1" added thereto are sequentially transmitted after time t1.

Referring to FIG. 12, there are shown the selection timing of the read data (blocks) 75a, 75b and 75c at the line number analysis selector 76 and the write timing of a selected packet at the output FIFO 81 in the case where the packet blocks are received as shown in FIG. 10. For simplicity, the next packet transmission line number for each packet is not shown in FIG. 12.

The read data 75a of the FIFO 70 includes the packets $P_0$, $P_3$, $P_6$, $P_8$, and $P_{10}$, and the scan data 75b of the FIFO 71 includes the packets $P_1$, $P_4$, $P_7$, $P_9$, and $P_{11}$. On the other hand, the read data 75c of the FIFO 72 becomes the idle packets 91, 92 and 93 caused by the failure after the packet $P_5$. The selection timing of these packets are the same as in the normal operation as shown in FIG. 9. Therefore, as shown in FIG. 12D, the single stream of the packets where the idle packets 91. 93 and 93 are inserted between the packets $P_7$ and $P_8$, the packets $P_2$ and $P_{10}$, and after the packet $P_{11}$.

In this manner, when detecting the occurrence of a failure, the multiplexing device 31 notifies the management system 35 of the occurrence of the failure and the intermediate transmission line on which the failure occurs. Therefore, the inverse multiplexing device 30 can take a procedure of avoiding the impaired line without a delay in time under the instruction of the management system 35.

Inverse-MUX/MUX Operation when Restored

Referring to FIGS. 13 and 14, an operation will be explained in the case where the intermediate transmission line having the failure thereon is restored.

As shown in FIG. 13, it is assumed that the intermediate transmission line 32c is restored at time t2. In this case, up to time t2, the single stream of the packet data on the input transmission line 33 is distributed between the intermediate transmission lines 32a and 32b based on the line information stored in the route table 55 as shown in FIG. 11.

Figures 13A, 13B, 13C:
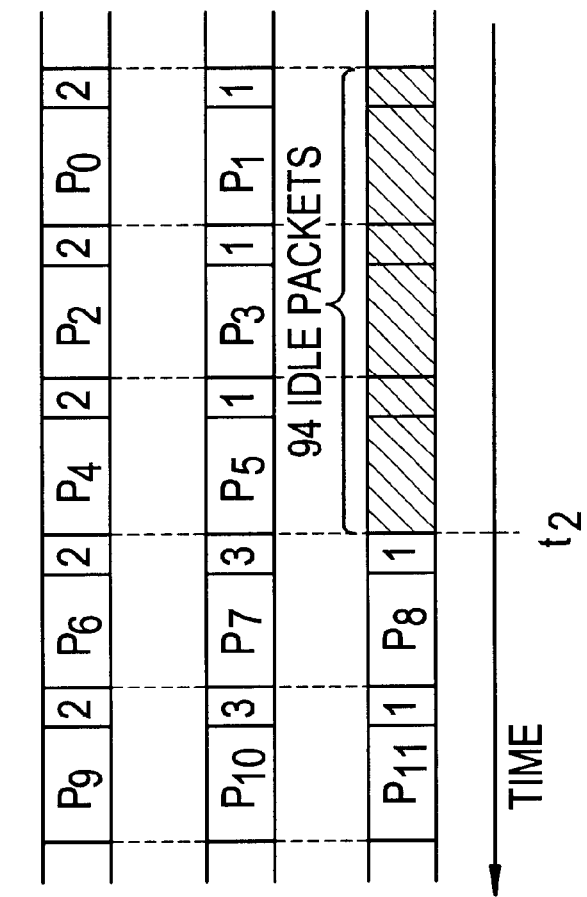
FIGS. 13A–13C are diagrams showing sequences of packets travelling the intermediate transmission lines, respectively, in the case where the one of the intermediate transmission lines is restored.

Consequently, on the intermediate transmission line 32a, as shown in FIG. 13A, the packets $P_0$, $P_3$ and $P_5$ having the next packet transmission line number "2" added thereto is transmitted up to time t2. On the intermediate transmission line 32b, as shown is FIG. 13B, the packets $P_1$, $P_3$ and $P_5$ having the next packet transmission line number "1" added thereto is transmitted up to time t2. Furthermore, on the intermediate transmission line 32c, as shown in FIG. 13C, the idle packets 94 are transmitted up to time t2.

At time t2, the route check controller 83 of the multiplexing device 31 detects the restoration of the intermediate transmission line 32c and resets the failure detection information notice 36 output to the management system 35.

The management system 35 sends the line change information notice 37 to she inverse multiplexing device 30 when the failure detection information notice 3B is reset. Then, after time t2, the management system 35 instructs the change of the line information of the route table 55 such that the intermediate transmission line 32c indicated by line number "3" is included as an entry in the route table 55. Therefore, the inverse multiplexing device 30 changes the line information of the route table 55 in accordance with the line information change notice 37 such that the use line number "3" and the next packet transmission number "3" are used. As a consequence, the line information of the route table 55 is changed from the state shown in FIG. 11 back to the state shown in FIG. 5.

After time t2, referring to FIG. 13A, on the intermediate transmission line 32a, the packets $P_6$ and $P_9$ having the next packet transmission number "2" added thereto is transmitted. On the intermediate transmission line 32b, as shown in FIG. 13B, since the next packet transmission number was changed to "3" In the previous packet block, after time t2, the packets $P_7$ and $P_{10}$ having the next packet transmission number "3" added thereto is transmitted. Than, on the intermediate transmission line 32c, as shown in FIG. 13C, the packets $P_0$ and $P_{11}$ having the next packet transmission line number "1" added thereto is transmitted.

Referring to FIG. 14, there are shown the selection timing of the read data (blocks) 76a, 75b and 75c at the line number analysis selector 76 and the write timing of a selected packet at the output FIFO 81 in the case where the packet blocks are received as shown in FIG. 13. For simplicity, the next packet transmission line number for each packet is not shown in FIG. 14.

The read data 75a of the FIFO 70 includes the packets $P_0$, $P_2$, $P_4$, $P_4$ and $P_9$, and the read data 75b of the FIFO 71 includes the packets $P_1$, $P_3$, $P_5$, $P_7$ and $P_{10}$. On the other hand, the read data 75c of the FIFO 72 becomes the idle packets 95, 96 and 97 caused by the failure before the packet $P_8$. The selection timing of these packets are the same as in the normal operation as shown in FIG. 9. Therefore, as shown in FIG. 14D, the single stream of the packets where the idle packets 93–97 are inserted between the packets $P_1$ and $P_2$, the packets $P_3$ and $P_4$, and the packets $P_5$ and $P_6$ until the intermediate transmission line 32c has bean restored. After the restoration, the original packet stream ($P_6$–$P_{11}$) is restored.

In this manner, when the intermediate transmission line is restored, the multiplexing device 31 instantly detects the restoration from the failure, and notifies the management system 35 of the restoration. The inverse multiplexing device 30 can swiftly take a procedure of including the restored line to be used without a delay in time under an instruction of the management system 35.

By the way, as apparent from the above explanation, the management system 35 can arbitrarily instruct the change of the line to the inverse multiplexing device 30 through the line change information notice 37. Consequently, in the line change and the addition work at the time of a normal operation, the side of the multiplexing device 31 can swiftly cope with the change only with the change of the route tab is 55 of the inverse multiplexing devise 30. As a consequence, a transmission line switching device which is flexible to be operated from the outside can be easily realized.

In addition as described above, no special procedure is needed between the inverse multiplexing device 30 and the multiplexing device 31 at the time of the occurrence of failures and at the time of the restoration. The normal procedure can be used as it is at the time of a normal operation.

Furthermore, the amount of accumulated data required for reproduction at the multiplexing device 31 can be dramatically reduced. According to the embodiment, the number of packet blocks accumulated in the input FIFO's of the multiplexing device 31 may be twice the number of the intermediate transmission lines in consideration of the deviation of arrival time of the packet blocks at the FIFO's. Consequently, at the multiplexing devise 31, the memory capacity for packet accumulation can be largely eliminated.

Incidentally, in this embodiment, three intermediate transmission lines are given. However, it goes without saying that the number of the intermediate transmission lines is not limited to three.

Further, in this embodiment, the next transmission line number to be used by the following packet is added to a transmission packet block, but the present invention is not limited thereto. For example, the next transmission line number may be notified to the multiplexing device 31 via a separate signal line.

Furthermore, in this embodiment, the route table 55 can be accessed by shifting the pointer 55c. However, the present invention is not limited thereto. For example, an instruction may be directly given to the route table 55 through the line change information notice 37.

Furthermore, is this embodiment, the management system 35 is provided to take a procedure of avoiding failures. However, it is possible to take a procedure of avoiding the failures at the time of the occurrence of a failure through a direct cooperation of the reverse multiplexing device 30 and the multiplexing device 31. This provides as advantage that the detection of a failure at the receiving and is swift.

As described above, according to the present invention, in a system composed of a plurality of intermediate transmission lines connected in parallel between high-speed transmission lines, a stream of data is divided into a plurality of data blocks and each of the data blocks is transmitted together with next line identification information through a selected one of the intermediate transmission lines. Therefore, at a receiving device, the original stream of data can be reproduced from the received data packets only by referring to the next line identification information associated with the received data pocket, resulting in simplified data reproduction procedure and reduced waiting time between the sending and receiving devices. Further, at the receiving device, there is no need of storing a large number of data blocks. Therefore, the amount of memory capacity at the receiving device can be dramatically reduced, resulting in reduced amount of hardware and the time required for data reproduction can be also reduced.

Furthermore, the occurrence of a failure on an intermediate line is directly detected from the transmission data at the receiving device. By notifying the sending device of the occurrence of a failure on an intermediate line, the sending device can switch the intermediate transmission lines. Consequently, without using a complicated protocol in the conventional example, the impaired intermediate transmission line can be swiftly avoided.

Then, since the line information of the usable intermediate transmission lines can be set in a route table, the switch-over and deletion of the intermediate transmission lines can be realised with flexibility.

Through such a procedure, even when the number of the intermediate transmission lime is increased, the switch-over of the intermediate transmission lines caused by the occurrence of a failure or the restoration therefrom can be swiftly carried out.

What is claimed is:

1. A method for transmitting a stream of data from a first transmission line to a second transmission line through a plurality of intermediate transmission lines connected in parallel, wherein a line speed of each of the intermediate transmission lines is lower than that of each of the first and second transmission lines and a total line capacity of the intermediate transmission lines is larger than a line capacity of each of the first and second transmission lines, comprising the steps of:

a) dividing the stream of data received from the first transmission line into a plurality of data blocks;

b) distributing the plurality of data blocks together with next line identification information corresponding to each of the data blocks among the plurality of intermediate transmission lines, the next line identification information identifying an intermediate transmission line to which a next data block following each of the data blocks is to be transmitted;

c) receiving data blocks having the next line identification information added thereto from the plurality of intermediate transmission lines; and d) reproducing the stream of data from the data blocks received from the plurality of intermediate transmission lines by referring to the next line identification information added to each of the data blocks to transmit the stream of data to the second transmission line.

2. A method according to claim 1, wherein in the step a), lengths of the data blocks are determined depending on line capacities of the intermediate transmission lines, respectively.

3. A method according to claim 1, wherein the step b) comprises the steps of:

b-1) adding the next line identification information corresponding to each of the data blocks;

b-2) selecting one of the intermediate transmission lines depending on the next line identification information added to a previously transmitted data block; and b-3) transmitting each of the data blocks having the next line identification information added thereto to a selected intermediate transmission line.

4. A method according to claim 1, wherein the step d) comprises the steps of:

d-1) reading the next line identification information added to each of the data blocks received from the plurality of intermediate transmission lines;

d-2) sequentially selecting one of data blocks received from the plurality of intermediate transmission lines depending on the next line identification information added to a previously received data block; and d-3) reproducing the stream of data from sequentially selected data blocks.

5. A route control method for a data transmission system comprised of a first transmission line and a second transmission line which are connected through a plurality of intermediate transmission lines connected in parallel, wherein a line speed of each of the intermediate transmission lines is lower than that of each of the first and second transmission lines and a total line capacity of the intermediate transmission lines is larger than a line capacity of each of the first and second transmission lines, comprising the steps of:

at a sending device connecting the first transmission line to the plurality of second transmission lines, a) dividing the stream of data received from the first transmission line into a plurality of data blocks;

b) distributing the plurality of data blocks together with next line identification information corresponding to each of the data blocks among the plurality of intermediate transmission lines, the next line identification information identifying an intermediate transmission line to which a next data block following each of the data blocks is to be transmitted;

at a receiving device connecting the plurality of intermediate transmission lines to the second transmission line, c) receiving data blocks having the next line identification information added thereto from the plurality of intermediate transmission lines;

d) checking each of the received data blocks to see whether a failure occurs on any of the intermediate transmission lines; and e) when a failure occurs on an intermediate transmission line, instructing the sending device to use the intermediate transmission lines other than the intermediate transmission line on which the failure occurs to distribute the plurality of data blocks.

6. A route control method according to claim 5, wherein in the step b), the plurality of data blocks together with next line identification information corresponding to each of the data blocks are distributed among the plurality of intermediate transmission lines by referring to a predetermined route table containing pairs of use line identification information and next use line identification information.

7. A route control method for a data transmission system comprised of a first transmission line and a second transmission line which are connected through a plurality of intermediate transmission lines connected in parallel, wherein a line speed of each of the intermediate transmission lines is lower than that of each of the first and second transmission lines and a total line capacity of the intermediate transmission lines is larger than a line capacity of each of the first and second transmission lines, comprising the steps of:

at a sending device connecting the first transmission line to the plurality of second transmission lines, a) dividing the stream of data received from the first transmission line into a plurality of data blocks;

b) distributing the plurality of data blocks together with next line identification information corresponding to each of the data blocks among the plurality of intermediate transmission lines, the next line identification information identifying an intermediate transmission line to which a next data block following each of the data blocks is to be transmitted;

at a receiving device connecting the plurality of intermediate transmission lines to the second transmission line, c) receiving data blocks having the next line identification information added thereto from the plurality of intermediate transmission lines;

d) storing a past selection sequence of the intermediate transmission lines;

e) counting the number of times the next line information added to a received data block deviates from the past selection sequence; and f) when the number of times counted in step e) exceeds a predetermined value, updating the cast selection sequence.

8. A route control method according to claim 7, wherein in the step b), the plurality of data blocks together with next fine identification information corresponding to each of the data blocks are distributed among the plurality of intermediate transmission lines by referring to a predetermined route table containing pairs of use line identification information and next use line identification information.

9. A system for transmitting a stream of data from a first transmission line to a second transmission line through a plurality of intermediate transmission fines connected in parallel, wherein a line speed of each of the intermediate transmission lines is lower than that of each of the first and second transmission lines and a total line capacity of the intermediate transmission lines is larger than a line capacity of each of the first and second transmission lines, the system comprising:

a first line switching device connecting the first transmission line to the plurality of intermediate transmission lines, comprising:

a data divider for dividing the stream of data received from the first transmission line into a plurality of data blocks;

a route table for storing pairs of use line identification information and next line identification information so that the next line identification information can be retrieved using the use line identification information, the next line identification information identifying an intermediate transmission line which is to be used after an intermediate transmission line identified by the use line identification information; and a data distributor for distributing the plurality of data blocks together with the next line identification information corresponding to each of the data blocks among the plurality of intermediate transmission lines by referring to the route table, and a second line switching device connecting the plurality at intermediate transmission lines to the second transmission line, comprising:

an input memory for storing data blocks having the next line identification information added thereto received from the plurality of intermediate transmission lines; and a data reproducer for reproducing the stream of data from the data blocks received from the plurality of intermediate transmission lines by referring to the next line identification information added to each of the data blocks to transmit the stream of data to the second transmission line.

10. A system according to claim 9, wherein the second line switching devise further comprises:

a route check controller for checking each of received data blocks to see whether a failure occurs on any of the intermediate transmission lines sad, when a failure occurs on an intermediate transmission line, instructing the first line switching device to use the intermediate transmission lines other than the intermediate transmission line on which the failure occurs to distribute the plurality of data blocks.

11. A system according to claim 9, wherein the second line switching device further comprises:

a memory for storing a past selection sequence of the intermediate transmission lines;

a counter for counting the number of times the next line identification information added to a received data block deviates from the past selection sequence; and a controller for updating the past selection sequence stored in the memory when the counter exceeds a predetermined value.

12. An inverse multiplexing device for use in a system for transmitting a stream of data from a first transmission line to a second transmission line through a plurality of intermediate transmission lines connected in parallel, wherein a line speed of each of the intermediate transmission lines is lower than that of each of the first and second transmission lines and a total line capacity of the intermediate transmission lines is larger than a line capacity of each of the first and second transmission lines, the inverse multiplexing device connecting the first transmission line to the plurality of intermediate transmission lines, comprising:

a data divider for dividing the stream of data received from the first transmission line into a plurality of data blocks;

a route table for storing pairs of use line identification information and next line identification information so that the next line identification information is retrieved using the next line identification information, the next line identification information identifying an intermediate transmission line which is to be used after an intermediate transmission line identified by the use line identification information;

an adder for adding the next line identification information corresponding to each of the data blocks;

a selector for selecting one of the intermediate transmission lines depending on the next line identification information added to a previously transmitted data block; and a transmitter for transmitting each of the data blocks having the next line identification information added thereto to a selected intermediate transmission line.

13. A multiplexing device for use in a system for transmitting a stream of data from a first transmission line to a second transmission line through a plurality of intermediate transmission lines connected in parallel, wherein a line speed of each of the intermediate transmission lines is lower than that of each of the first and second transmission lines and a total line capacity of the intermediate transmission lines is larger than a line capacity of each of the first and second transmission lines, the multiplexing device connecting the plurality of intermediate transmission lines to the second transmission line, comprising:

an input memory for storing data blocks having next line identification information added thereto received from the plurality of intermediate transmission linen;

a selector for sequentially selecting one of data blocks received from the plurality of intermediate transmission lines depending on the next line identification information added to a previously received data block; and a transmitter for transmitting the stream of data reproduced from sequentially selected data blocks to the second transmission line.

14. A multiplexing device according to claim 13, further comprises:

a route check controller for checking each of received data blocks to see whether a failure occurs on any of the intermediate transmission lines and, when a failure occurs on an intermediate transmission line, instructing a line switching device to use the intermediate transmission lines other than the intermediate transmission line on which the failure occurs to distribute the plurality of data blocks.

15. A multiplexing device according to claim 13, further comprises:

a memory for storing a past selection sequence of the intermediate transmission lines;

a counter for counting the number of times the next line identification information added to a received data block deviates from the past selection sequence; and a controller for updating the past selection sequence stored in the memory when the counter exceeds a predetermined value.

* * * * *